US008410795B1

(12) United States Patent
Peng et al.

(10) Patent No.: US 8,410,795 B1
(45) Date of Patent: Apr. 2, 2013

(54) SERPENTINE TOUCH SENSOR PATTERN

(75) Inventors: Tao Peng, Shanghai (CN); Gregory J. Landry, Merrimack, NH (US); Xiaoping Weng, Shanghai (CN); Yingzhu Deng, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/549,379

(22) Filed: Jul. 13, 2012

Related U.S. Application Data

(63) Continuation of application No. 13/548,125, filed on Jul. 12, 2012.

(60) Provisional application No. 61/612,146, filed on Mar. 16, 2012.

(51) Int. Cl.
*G01R 27/26* (2006.01)

(52) U.S. Cl. ........ 324/658; 324/686; 345/173; 345/174; 178/18.06

(58) Field of Classification Search .................. 324/658, 324/686; 345/173–174; 178/18.06
See application file for complete search history.

(56) References Cited

U.S. PATENT DOCUMENTS

| 7,129,935 | B2 * | 10/2006 | Mackey ..................... 345/174 |
| 7,548,073 | B2 * | 6/2009 | Mackey et al. ............... 324/660 |
| 8,279,194 | B2 | 10/2012 | Kent et al. |
| 2007/0236618 | A1 | 10/2007 | Maag |
| 2007/0262962 | A1 | 11/2007 | Xiaoping et al. |
| 2008/0150906 | A1 | 6/2008 | Grivna |
| 2009/0021267 | A1 * | 1/2009 | Golovchenko et al. ....... 324/686 |
| 2009/0160682 | A1 | 6/2009 | Bolender |
| 2010/0302201 | A1 | 12/2010 | Ritter |
| 2011/0096018 | A1 | 4/2011 | Lee |
| 2011/0132670 | A1 | 6/2011 | Yeh |
| 2011/0304578 | A1 | 12/2011 | Kim |
| 2011/0316567 | A1 | 12/2011 | Chai |
| 2012/0044165 | A1 | 2/2012 | Kwak |
| 2012/0044193 | A1 | 2/2012 | Peng et al. |
| 2012/0044201 | A1 | 2/2012 | Xiaoping |

OTHER PUBLICATIONS

Tim Blankenship, et al., Projected-Capacitive Touch Systems from the Controller Point of View, <URL:http:/japan.maxim-ic.com/app-notes/index.mvp/id/5047>, Jun. 10, 2011, Accessed Jul. 12, 2012.
Steve Kolokowsky, et al., From Your Finger to the Screen—How Touch Screens Understand, <URL:http://www.rtcmagazine.com/articles/view/101589>, Apr. 2010, Accessed Jul. 12, 2012.
U.S. Appl. No. 61/612,146: "Touchscreen using a Dual-Solid Diamond (DSD) Pattern with Side-Bridges (Snake connections)," Tao Peng, filed on Mar. 16, 2012; 3 pages.
International Search Report for International Application No. PCT/US12/52711 dated Nov. 6, 2012; 2 pages.
USPTO Non-Final Rejection for U.S. Appl. No. 13/548,125 dated Sep. 12, 2012; 8 pages.
USPTO Notice of Allowance for U.S. Appl. No. 13/548,125 dated Jan. 10, 2013; 8 pages.
Written Opinion of the International Searching Authority for International Application No. PCT/US12/52711 mailed Nov. 6, 2012; 5 pages.

* cited by examiner

*Primary Examiner* — Arleen M Vazquez

(57) ABSTRACT

A capacitive sensor array may include a first sensor element of a first plurality of sensor elements, and a second sensor element. The second sensor element may include a plurality of subelements, where each of the plurality of subelements is connected to at least another of the plurality of subelements by one of a plurality of connecting traces. A width of each of the connecting traces may be less than a width of any of the plurality of subelements. Connecting traces in a subset of the plurality of connecting traces may be staggered about a central axis of the second sensor element.

20 Claims, 9 Drawing Sheets

SERPENTINE TOUCH SENSOR PATTERN

CROSS REFERENCE TO RELATED APPLICATIONS

This application is a continuation of U.S. patent application Ser. No. 13/548,125, filed on Jul. 12, 2012, which claims priority to U.S. Provisional Application No. 61/612,146, filed on Mar. 16, 2012, both of which are hereby incorporated by reference.

TECHNICAL FIELD

This disclosure relates to the field of touch-sensors and, in particular, to trace patterns of elements in capacitive touch-sensor arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive touch sensor pattern may be constructed from a single patterned layer of conductive material and may have a trace geometry that minimizes signal disparity without the use of excessive metal bridges.

In one embodiment, such a capacitive touch sensor pattern may include two sets of intersecting sensor elements, where each sensor element in a first set intersects each sensor element of the other set. One set of sensor elements may be used as transmit (TX) electrodes, while the other set of sensor elements is used as receive (RX) electrodes in a mutual capacitance sensing system. In an alternative embodiment, the sensor elements may be used in a self-capacitance sensing system. In one embodiment, each sensor element in at least one of the sets of sensor elements may include several sub-elements connected together by a number of connecting traces. In one embodiment, some of the connecting traces may be staggered about a longitudinal central axis of the sensor element such that a path of the sensor element alternates directions on either side of the longitudinal central axis, to form a snake-like or serpentine pattern. In one embodiment, only one of the TX and RX sets of sensor elements may have this serpentine pattern; alternatively, both of the TX and RX sets of sensor elements have a serpentine pattern.

In one embodiment, both TX and RX sets of sensor elements may be constructed using a single patterned layer of conductive material, with bridges used to join sections of the sensor elements that are separated at intersections between the TX and RX pairs. In an alternative embodiment, the TX and RX sets of sensor element may each be constructed from a separate patterned layer of conductive material such that bridges are not needed.

Figure 1:
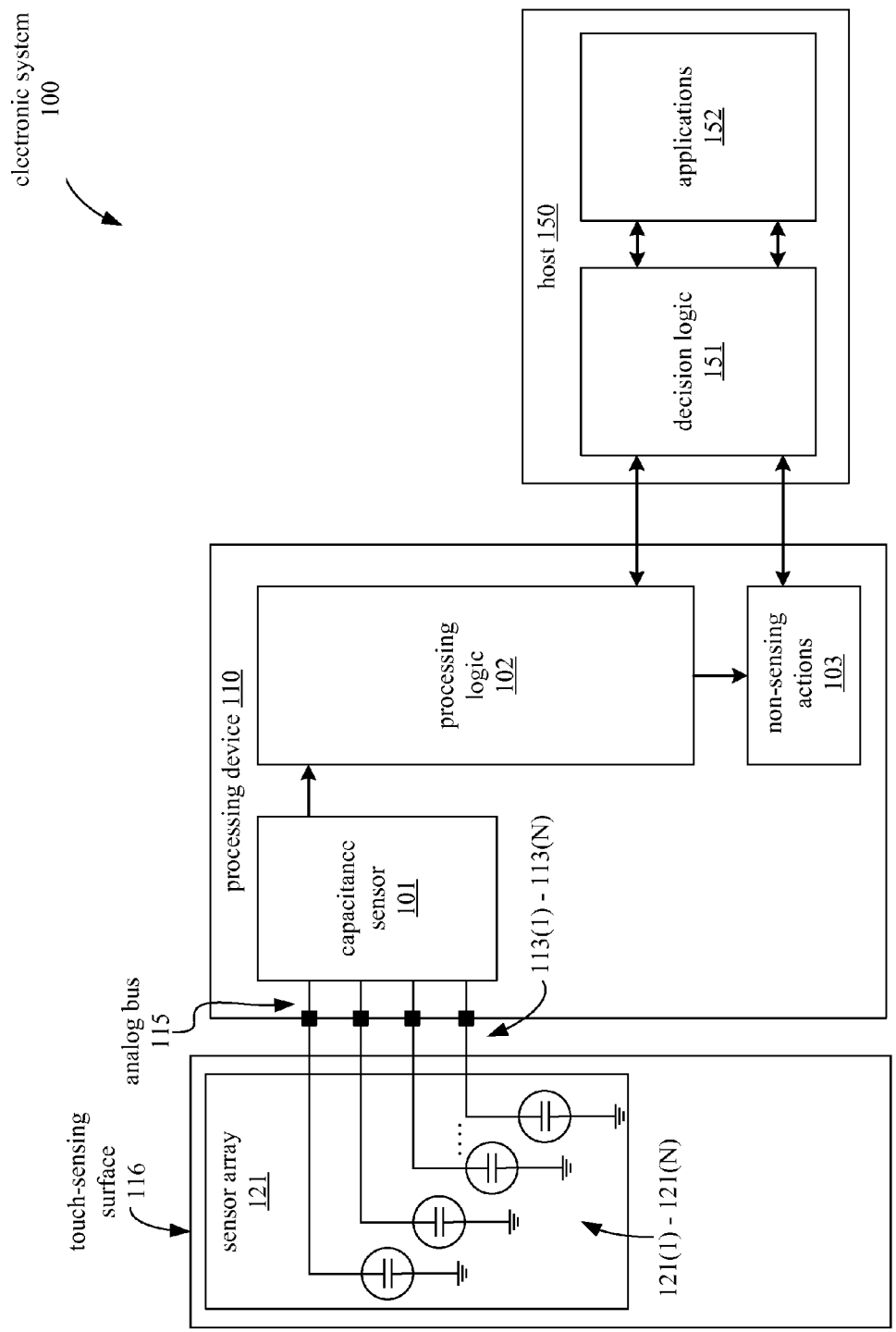
FIG. 1 is a block diagram illustrating an embodiment of an electronic system that processes touch sensor data.

FIG. 1 illustrates a block diagram of one embodiment of an electronic system 100 including a processing device 110 that may be configured to measure capacitances from a touch sensing surface 116 including a capacitive touch sensor pattern as described above. The electronic system 100 includes a touch-sensing surface 116 (e.g., a touchscreen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor.

In one embodiment, the capacitance sensor 101 may include a relaxation oscillator or other means to convert a capacitance into a measured value. The capacitance sensor 101 may also include a counter or timer to measure the oscillator output. The processing device 110 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on a Chip (PSoC™) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
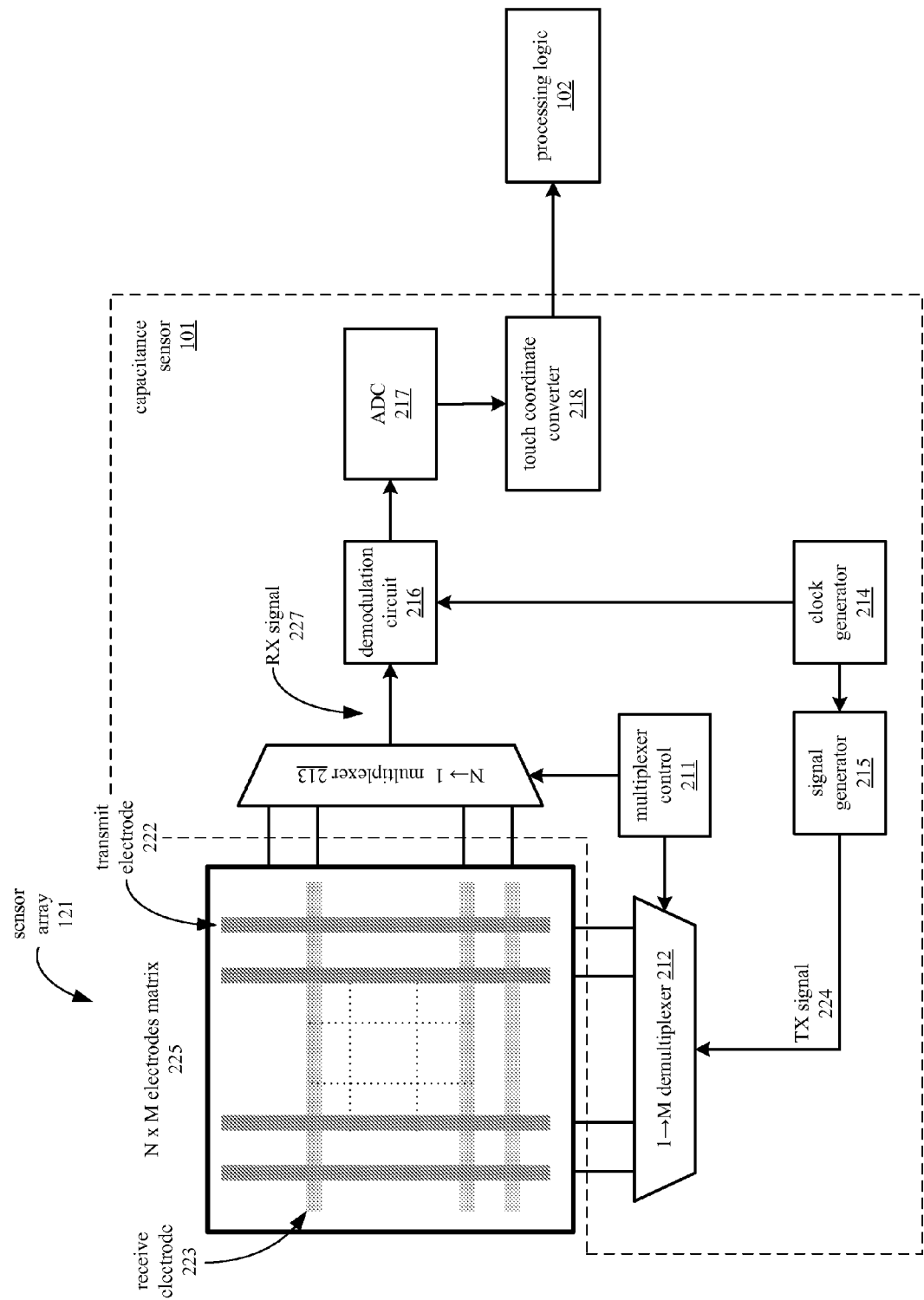
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that converts changes in measured capacitances to coordinates indicating the presence and location of touch. The coordinates are calculated based on changes in measured capacitances relative to the capacitances of the same touch sensor array 121 in an un-touched state. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 may be implemented in the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied. In an alternate embodiment the TX signal 224 may be presented in a true form to a subset of the transmit electrodes 222 and in complement form to a second subset of the transmit electrodes 222, wherein there is no overlap in members of the first and second subset of transmit electrodes 222.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a change in the measured mutual capacitance between only some of the electrodes. For example, if a finger is placed near the intersection of transmit electrode 222 and receive electrode 223, the presence of the finger will decrease the charge coupled between electrodes 222 and 223. Thus, the location of the finger on the touchpad can be determined by identifying the one or more receive electrodes having a decrease in measured mutual capacitance in addition to identifying the transmit electrode to which the TX signal 224 was applied at the time the decrease in capacitance was measured on the one or more receive electrodes.

By determining the mutual capacitances associated with each intersection of electrodes in the matrix 225, the presence and locations of one or more conductive objects may be determined. The determination may be sequential, in parallel, or may occur more frequently at commonly used electrodes.

In alternative embodiments, other methods for detecting the presence of a finger or other conductive object may be used where the finger or conductive object causes an increase in measured capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined based on the locations of one or more electrodes at which a change in measured capacitance is detected.

The induced current signal 227 is integrated by demodulation circuit 216. The rectified current output by demodulation circuit 216 can then be filtered and converted to a digital code by ADC 217.

A series of such digital codes measured from adjacent sensor or intersections may be converted to touch coordinates indicating a position of an input on touch sensor array 121 by touch coordinate converter 218. The touch coordinates may then be used to detect gestures or perform other functions by the processing logic 102.

In one embodiment, the capacitance sensor 101 can be configured to detect multiple touches. One technique for the detection and location resolution of multiple touches uses a two-axis implementation: one axis to support rows and another axis to support columns. Additional axes, such as a diagonal axis, implemented on the surface using additional layers, can allow resolution of additional touches.

Figure 3A:
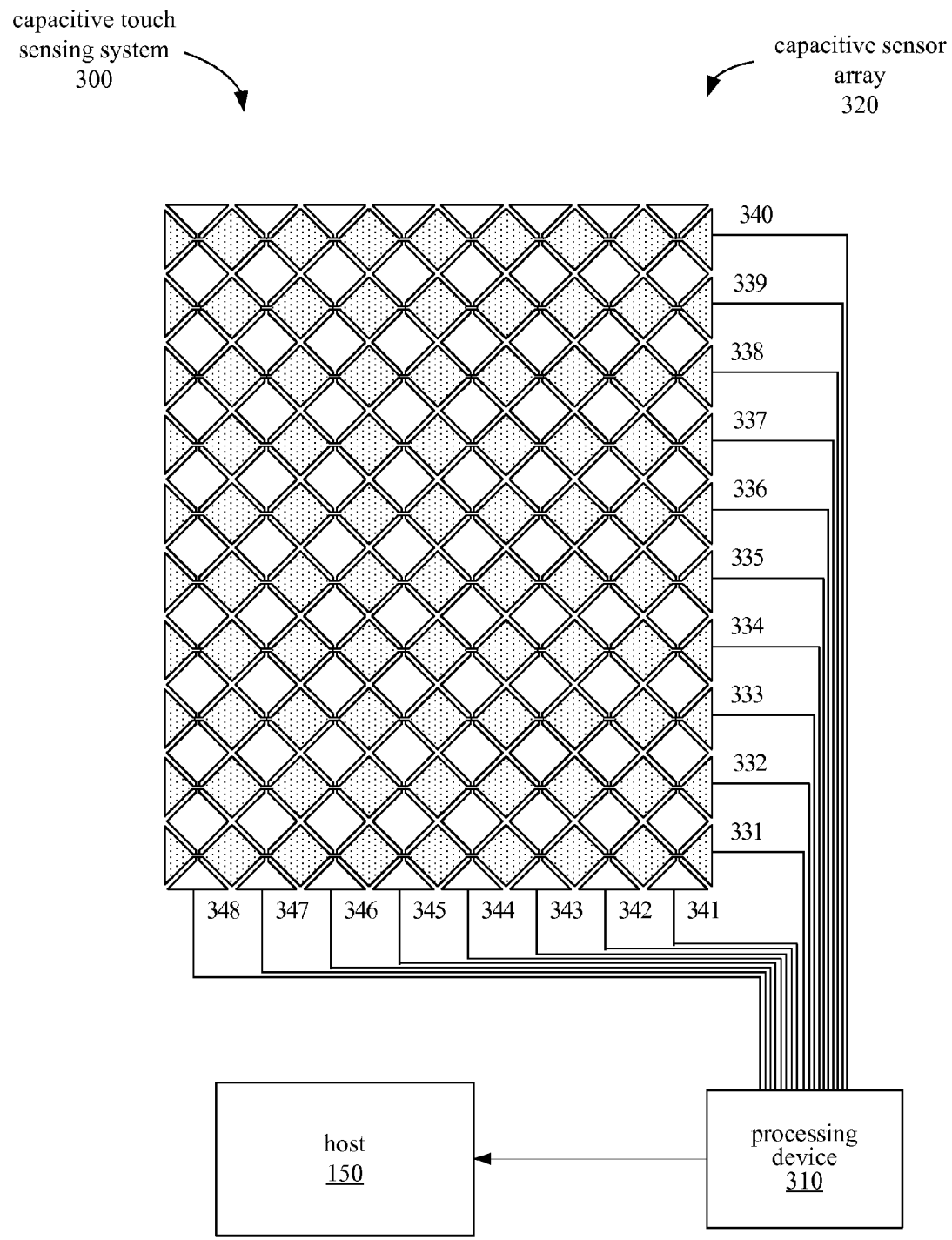
FIG. 3A illustrates an embodiment of an electronic touch-sensing system using a single solid diamond capacitive sensor pattern.

FIG. 3A illustrates an embodiment of a capacitive touch sensing system 300 that includes a capacitive sensor array 320. Capacitive sensor array 320 includes a plurality of row sensor elements 331-340 and a plurality of column sensor elements 341-348. The row and column sensor elements 331-348 are connected to a processing device 310, which may include the functionality of capacitance sensor 101, as illustrated in FIG. 2. In one embodiment, the processing device 310 may perform TX-RX scans of the capacitive sensor array 320 to measure a mutual capacitance value associated with each of the intersections between a row sensor element and a column sensor element in the sensor array 320. The measured capacitances may be further processed to determine higher resolution locations of one or more contacts at the capacitive sensor array 320.

In one embodiment, the processing device 310 is connected to a host 150 which may receive the measured capacitances or calculate high precision locations from the processing device 310.

Figure 3B:
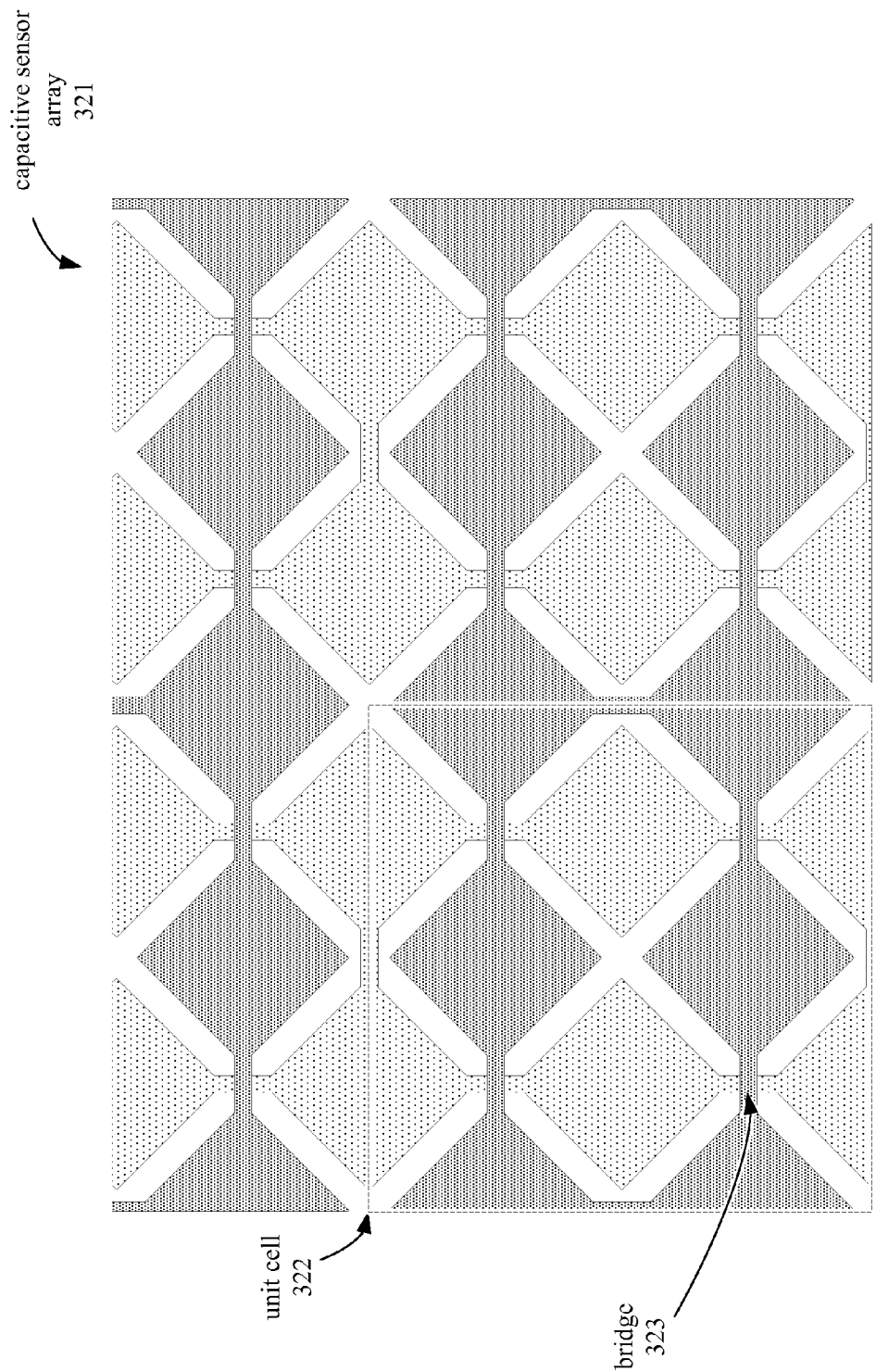
FIG. 3B illustrates an embodiment of a dual solid diamond capacitive sensor pattern.

The sensor array 320 illustrated in FIG. 3A includes sensor elements arranged in a diamond pattern. Specifically, the sensor elements 331-348 of sensor array 320 are arranged in a single solid diamond (SSD) pattern. FIG. 3B illustrates a capacitive sensor array 321 having an alternate embodiment of the diamond pattern, which is the dual solid diamond (DSD) pattern. Each of the sensor elements of capacitive sensor array 321 includes two rows or columns of electrically connected diamond shaped traces. Relative to the SSD pattern, the DSD pattern has improved signal disparity characteristics due to an increase in the coupling between TX and RX sensor elements while maintaining the same self-capacitance coupling possible between each sensor element and a conductive object near the sensor element. The DSD pattern may also provide higher sensitivity for tracking smaller objects, such as the point of a stylus, as compared to patterns having larger features, such as SSD. However, the DSD pattern also increases the number of bridges (such as bridge 323) used to create the pattern, which may result in decreased manufacturing yield. The increased number of bridges may also be visible if metal bridges are used. For example, sensor array 321 includes four bridges within unit cell 322.

Figure 4A:
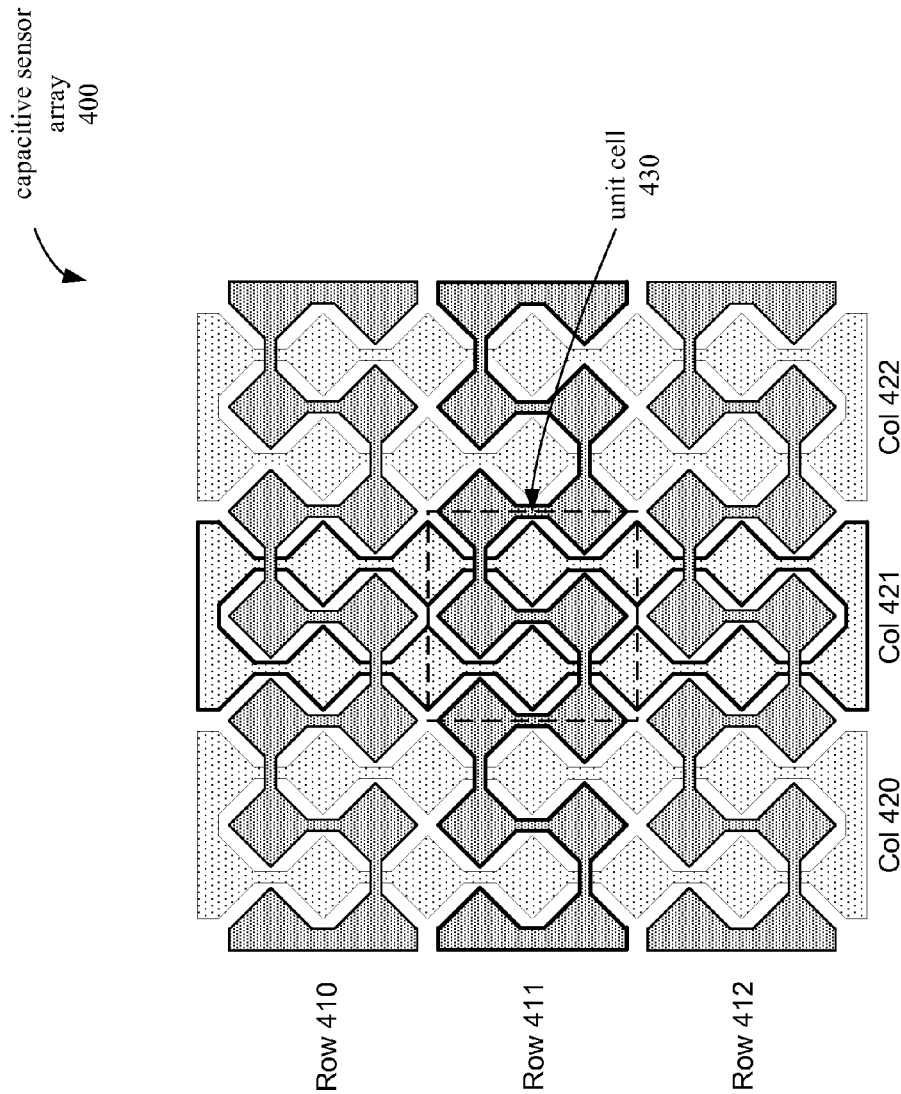
FIG. 4A illustrates an embodiment of a capacitive sensor array.

FIG. 4A illustrates an embodiment of a capacitive sensor array 400 having a pattern similar to a DSD pattern as illustrated in FIG. 3B, but wherein each row sensor element is made from diamond-shaped subelements electrically connected together by connecting traces to form a snake-like or serpentine pattern. In one embodiment, the capacitive sensor array 400 may be used to implement a multi-touch sensing surface controlled by a capacitive touch-screen controller, which may be implemented by a processing device such as device 110, for example.

In one embodiment, capacitive sensor array 400 may be constructed by printing, etching, depositing, or otherwise placing conductive material onto a substrate. For example, the sensor array pattern may be constructed from Indium Tin Oxide (ITO) or some other conductive material deposited onto a transparent substrate such as glass to create a transparent touch-sensing surface.

In one embodiment, the capacitive sensor array 400 is constructed from a single layer of conductive material, such as copper or ITO, and bridges of conductive material are used to join portions of row sensor elements where they intersect with column sensor elements. Alternatively, the bridges may be used to join portions of column sensor elements where they intersect with row sensor elements.

In an alternative embodiment, the capacitive sensor array 400 may be constructed from more than one layer of conductive material. For example, the sensor array 400 may be constructed from two different layers of conductive material, with one layer for row sensor elements and another layer for column sensor elements. In such an embodiment where two or more layers are used, intersections may be formed between sensor elements where the layers overlap, without using bridges.

With reference to FIG. 4A, the capacitive sensor array 400 may include two sets of sensor elements, with one set of row sensor elements and another set of column sensor elements. In one embodiment, row sensor elements 410-412 may be used as transmit (TX) sensor elements and column sensor elements 420-422 may be used as receive (RX) sensor elements in a mutual capacitance sensing system.

Each row sensor element is associated with a row of unit cells, and each column sensor element is associated with a column of unit cells. Each unit cell is associated with a unique pair of a row sensor element and a column sensor element. For example, the unit cell 430 is associated with row sensor element 411 and column sensor element 421. In one embodiment, each point within the boundaries of each unit cell is nearest to a gap between the pair of sensor element associated with the unit cell than to a gap between any other pair of sensor elements. For example, each point within the unit cell 430 is nearer to a gap between the associated pair of sensor elements 411 and 421 than to a gap between any other pair of sensor elements.

FIG. 4A illustrates an embodiment of a sensor array 400 where one set of sensor elements (row elements 410-412) includes serpentine sensor element and the other set of sensor elements (column elements 420-422) does not include serpentine sensor elements.

In one embodiment, each of the plurality of non-serpentine column sensor elements 420-422 may include a plurality of diamond-shaped subelements electrically connected to each other by connecting traces. In one embodiment, each of the diamond-shaped subelements may be wider than any of the connecting traces. In one embodiment, the connecting traces may run in parallel along a long axis of the column sensor element. In one embodiment, such an arrangement may result in a plurality of possible current paths from one end of the sensor element to the other.

Figure 4B:
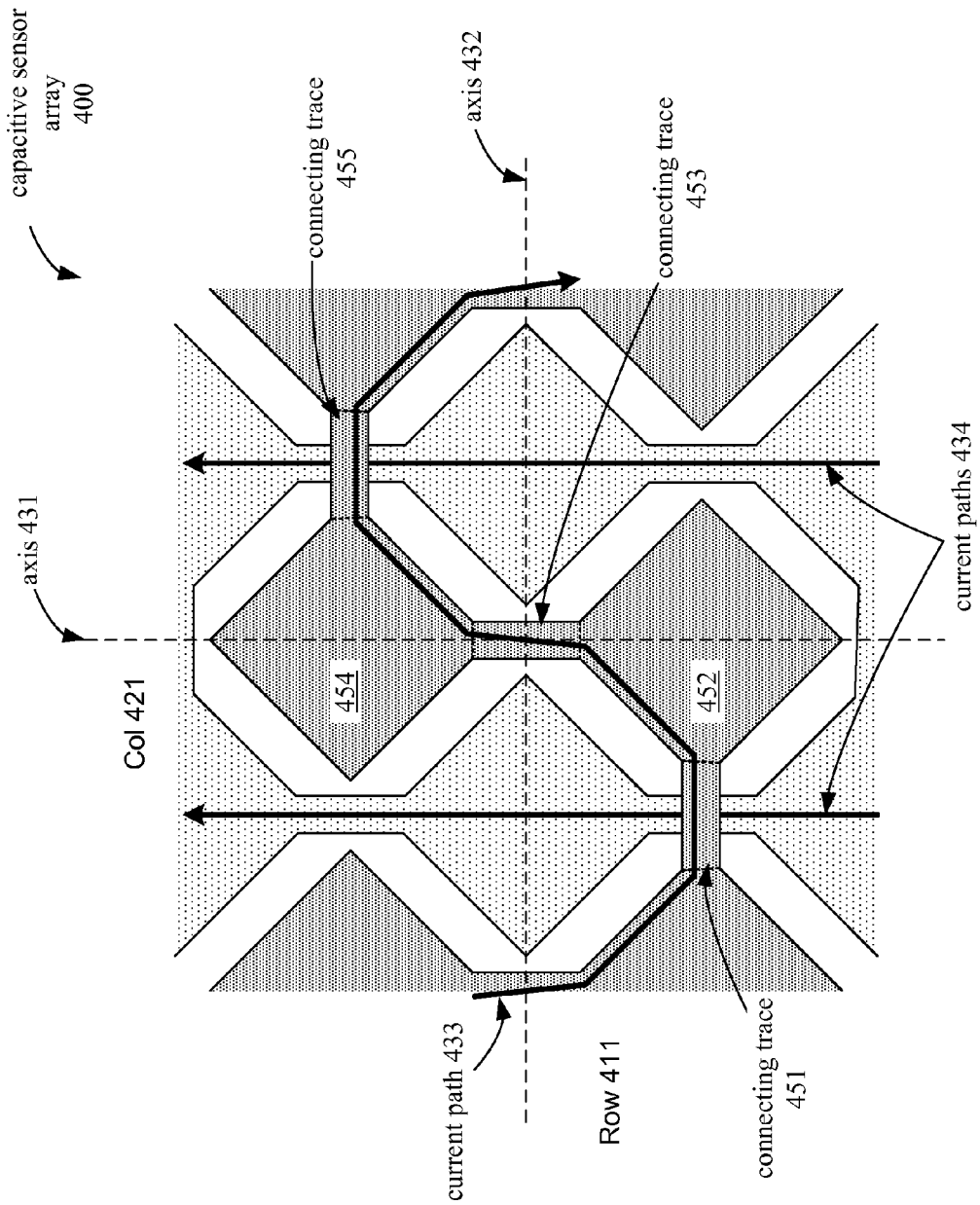
FIG. 4B illustrates a unit cell of a capacitive sensor array, according to one embodiment.

FIG. 4B illustrates a single unit cell of capacitive sensor array 400, according to an embodiment. With reference to FIG. 4B, the geometry of column sensor element 421 results in two available current paths 434 from one end of the sensor element 421 to the other end. Neither of the current paths 434 crosses the longitudinal central axis 431 of the sensor element 421.

Similar to the column sensor elements, each of the row sensor elements 410-412 may also include a plurality of diamond-shaped subelements. With reference to FIG. 4B, the row sensor element 411 includes diamond-shaped subelements 452 and 454, which are electrically connected by connecting trace 453. Connecting traces 451 and 455 electrically connect subelements 452 and 454, respectively, to other subelements of the row sensor element 411.

In one embodiment, the widths of the subelements, such as subelements 452 and 454, are greater than the widths of the connecting traces, such as traces 451, 453, and 455. In one embodiment, the widths of the subelements and connecting traces may be considered as being perpendicular to the shortest current path 433 through the sensor element 411.

In one embodiment, the connecting traces in a subset of the connecting traces are staggered about the central axis of the sensor element. For example, connecting traces 451 and 455 represent a subset of the connecting traces in the unit cell and are staggered about the central axis 432 of the row sensor element 411. In one embodiment, other connecting traces in the unit cell, such as connecting trace 453 (which is in between traces 452 and 455 along the path 433), may be positioned on the central axis 432. In one embodiment, the longitudinal central axis 432 bisects the sensor element 411 along the length of the sensor element 411, and equally divides the width of the sensor element 411.

In one embodiment, the unit cell may contain an equal number of subelements of the sensor element on either side of the central axis 432. For example, the unit cell illustrated in FIG. 4B includes two whole subelements 452 and 454 of sensor element 411 and four halves of subelements of sensor element 411. These are arranged within the unit cell such that each side of central axis 432 has one whole subelement and two halves of subelements.

In one embodiment, the arrangement of subelements is symmetrical about the central axis 432. In an alternative embodiment, the subelements may be arranged asymmetrically about the central axis 342. In one embodiment, the arrangement of the connecting traces may be symmetrical or asymmetrical about the central axis 432. FIG. 4B illustrates an asymmetrical arrangement of connecting traces.

In one embodiment the sensor element may include one or more connecting traces within the unit cell that have a longitudinal axis in a different direction than other connecting traces. For example, connecting trace 453 has a longitudinal axis that is substantially perpendicular to the longitudinal axes of connecting traces 451 and 455.

In one embodiment, a first sensor element may intersect a second sensor element at fewer than three intersections within the unit cell. For example, with reference to FIG. 4B, the row sensor element 411 intersects the column sensor element 421 at two locations, corresponding to connecting trace 451 and connecting trace 455.

In one embodiment, each of the row sensor elements may thus intersect each of the column sensor elements at two locations per unit cell. In one embodiment, the two intersections per unit cell may be located on opposite sides of a central axis of the sensor element. For example, connecting traces 451 and 455 are located on opposite sides of the central axis 432.

Figure 5A:
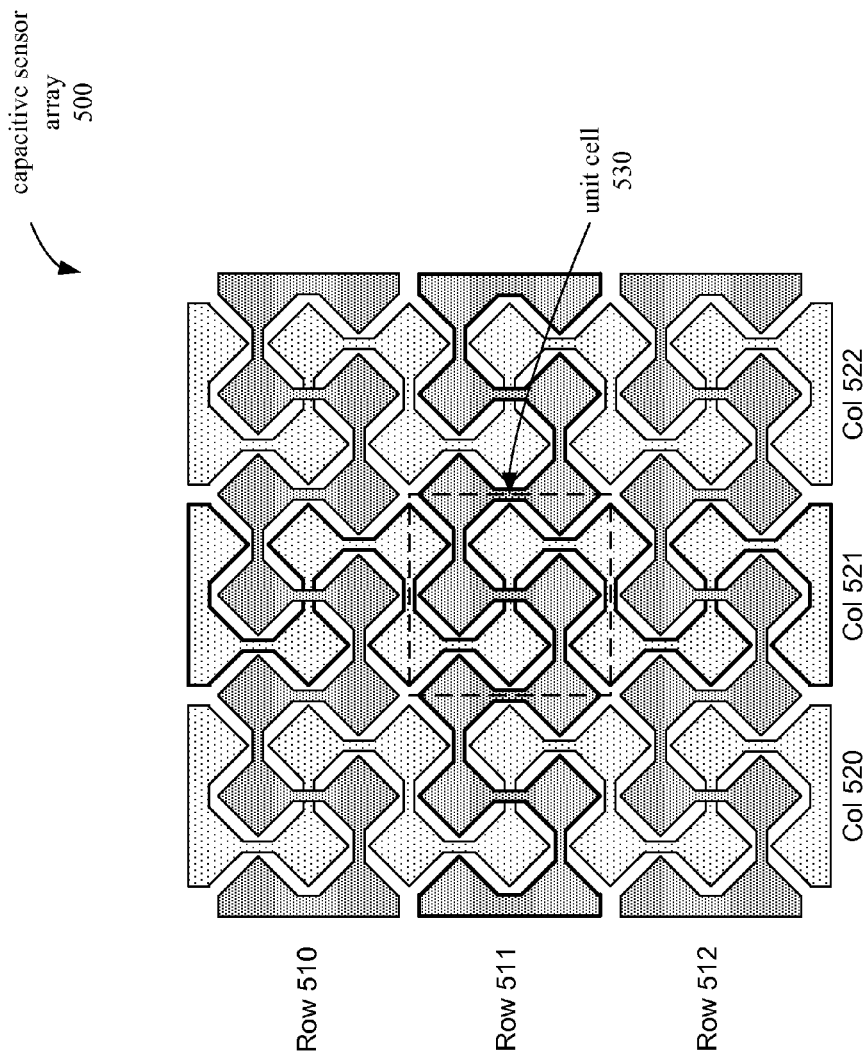
FIG. 5A illustrates an embodiment of a capacitive sensor array.

FIG. 5A illustrates an embodiment of a capacitive sensor array 500 having a pattern similar to a DSD pattern as illustrated in FIG. 3B, but wherein each row sensor element and column sensor element is made from diamond-shaped subelements electrically connected together by connecting traces to form a snake-like or serpentine pattern. In one embodiment, the width of each subelement is greater than the width of any of the connecting traces. In one embodiment, the capacitive sensor array 500 may be used to implement a multi-touch sensing surface controlled by a capacitive touchscreen controller, which may be implemented by a processing device such as device 110, for example.

With reference to FIG. 5A, the area of the capacitive sensor array 500 may be divided into a plurality of unit cells each associated with a particular TX-RX pair of sensor elements. This plurality of unit cells may include, for example, a unit cell 530 that includes an area associated with row sensor element 511 and column sensor element 521. Each point within the unit cell 530 may be nearer to a gap between sensor element 511 and 521 than to any gap between any other pair of sensor elements. The unit cell for a pair of sensor elements thus designates an area where the capacitive coupling between those sensor elements is the greatest.

Figure 5B:
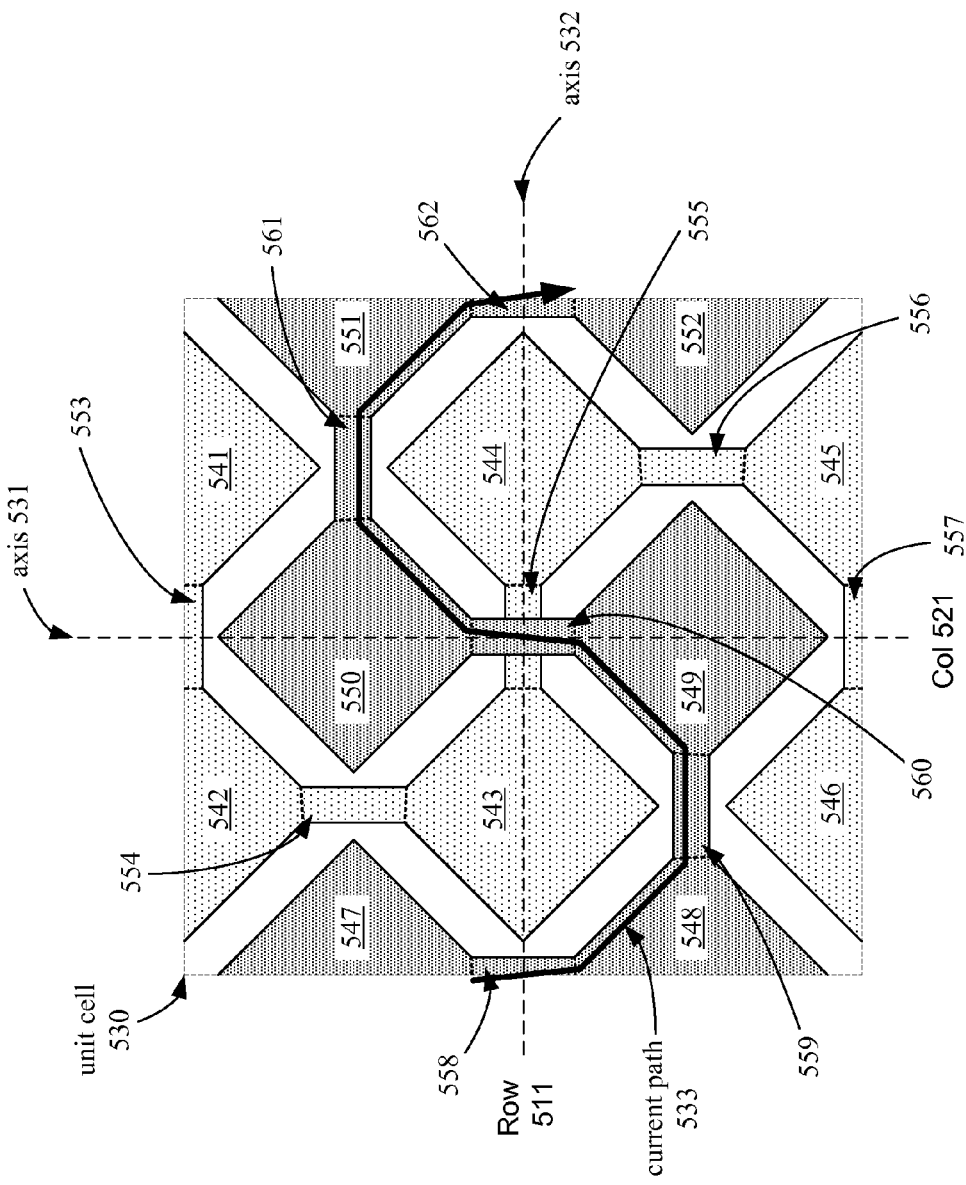
FIG. 5B illustrates a unit cell of a capacitive sensor array, according to one embodiment.

FIG. 5B illustrates a close-up view of unit cell 530 of capacitive sensor array 500, according to one embodiment. Unit cell 530 corresponds to the sensor elements 511 and 521. Row sensor element 511 has a longitudinal central axis 532 that runs the length of sensor element 511 and evenly divides the width of sensor element 511. Column sensor element 521 has a longitudinal central axis 531 that runs the length of sensor element 521 and evenly divides the width of sensor element 521.

In one embodiment, the capacitive sensor array 500 may have row and column sensor elements that intersect each other at a single intersection per unit cell. In one embodiment, this single intersection may be located on a longitudinal central axis of one or both of the sensor elements. For example, within unit cell 530, row sensor element 511 intersects column sensor element 521 at the center of unit cell 530, where a connecting trace 560 of sensor element 511 overlaps a connecting trace 555 of sensor element 521. This intersection lies on the central axis 532 of row sensor element 511, and also lies on a central axis 531 of column sensor element 521.

Figure 6:
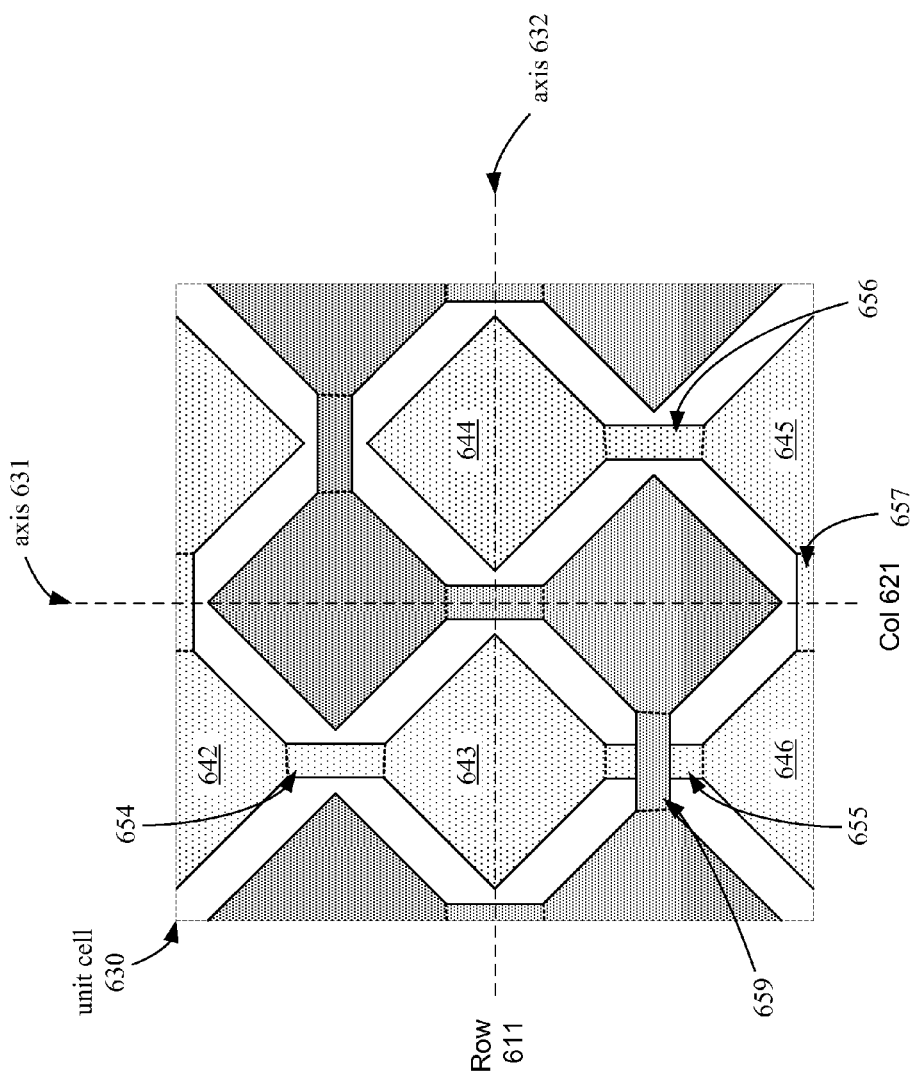
FIG. 6 illustrates a unit cell of a capacitive sensor array, according to one embodiment.

In an alternative embodiment, the single intersection may be located away from the longitudinal central axis of one or both of the sensor elements. For example, FIG. 6 illustrates an embodiment of a unit cell 630 of a capacitive sensor array where a serpentine row sensor element 611 intersects with a column sensor element 621 at connecting traces 655 and 659, away from either of the longitudinal central axes 631 and 632 of the sensor elements 621 and 611. In one embodiment, the non-serpentine sensor element 621 may include one or more terminal branches that branch away from a main trace. For example, a terminal branch of the sensor element 621 may include subelements 644 and 645 connected together by traces 657 and 656. The terminal branch branches away from a main trace comprising subelements 642-646 and traces 654-655, and terminates at subelement 644.

Referring back to FIG. 5B, in one embodiment, the unit cell 530 may include a plurality of connecting traces that electrically connect the subelements of the same sensor element within the unit cell. The connecting traces in a subset of the plurality of connecting traces may be staggered so that they are located on opposite sides of a central axis of the sensor element.

For example, unit cell 530 includes a plurality of connecting traces 553-557 that electrically connect a plurality of subelements 541-546 of column sensor element 521. Similarly, connecting traces 558-562 electrically connect a plurality of subelements 547-552 within the unit cell 530.

Thus, for the row sensor element 511, a subset of connecting traces including traces 559 and 561 may be staggered about the central axis 532 so that they are located on opposite sides of the central axis 532 of sensor element 511. In one embodiment, the staggered traces 559 and 561 are also located on opposite sides of the central axis 531 of the other sensor element 521. Similarly, for the column sensor element 521, a subset of connecting traces including traces 554 and 556 may be staggered about the central axis 531 so that they are located on opposite sides of the central axis 531 of sensor element 521.

In one embodiment, another subset of connecting traces of each sensor element may be located along the longitudinal central axis for that sensor element. For example, the connecting traces 558, 560, and 562 of row sensor element 511 are located along the central axis 532 of the sensor element 511. Similarly, the connecting traces 553, 555, and 557 of column sensor element 521 are located along the central axis 531 of the sensor element 521.

In one embodiment, the shortest current path 533 through the sensor element 511 passes through the subelements 547-552 and the connecting traces 558-562 in a particular sequence. The connecting traces may be numbered accordingly; for example, connecting traces 558, 559, 560, 561, and 562 may correspond to the ordinal numbers 1, 2, 3, 4, and 5. Under this numbering system, an embodiment may have odd numbered connecting traces that are parallel to each other and even numbered connecting traces that are parallel to each other. For example, the connecting traces 558, 560, and 562 are parallel to each other as illustrated in FIG. 5B, while the connecting traces 559 and 561 are parallel to each other.

In one embodiment, each even numbered trace may be substantially perpendicular to each odd numbered trace. For example, connecting trace 559 may be substantially perpendicular to each of connecting traces 558, 560, and 562. In an alternative embodiment, the even numbered connecting traces are not perpendicular to the odd numbered connecting traces.

In one embodiment, each connecting trace is substantially perpendicular to the next nearest connecting trace of the same sensor element. For example, connecting trace 560 may be substantially perpendicular to each of the nearest connecting traces 559 and 561.

As described herein, the angle between connecting traces may be determined based on the longitudinal axes of the connecting traces; perpendicular connecting traces may have longitudinal axes that are perpendicular, while parallel connecting traces may have longitudinal axes that are parallel.

In alternative embodiments, each connecting trace may be positioned at some other angle with respect to the previous connecting trace and the subsequent connecting trace. For example, connecting trace 559 may be positioned at an angle relative to the previous connecting trace 558, and may be positioned at a different angle relative to the subsequent connecting trace 560.

In the foregoing embodiments, various modifications can be made; for example, row sensor elements and column sensor elements may be interchanged, and row or column sensor elements may be used as either TX or RX sensor elements. Furthermore, in some embodiments, intersections between row and column sensor elements may be replaced with conductive bridges. For example, bridges may be used to electrically connect portions of sensor elements when both row and column sensor elements are constructed from a single layer of conductive material. As described herein, conductive elements that are "electrically connected" or "electrically coupled" may be coupled such that a relatively low resistance conductive path exists between the conductive elements.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sensor array, comprising:
a first sensor element of a first plurality of sensor elements; and
a second sensor element comprising a plurality of subelements, wherein each of the plurality of subelements is connected to at least another of the plurality of subelements by one of a plurality of connecting traces, wherein a width of each of the connecting traces is less than a width of any of the plurality of subelements, and wherein connecting traces in a subset of the plurality of connecting traces are staggered about a central axis of the second sensor element.

2. The capacitive sensor array of claim 1, wherein each point in a unit cell associated with the first sensor element and the second sensor element is nearer to a gap between the first sensor element and the second sensor element than to a gap between any other pair of sensor elements, and wherein the unit cell contains an equal number of subelements of the second sensor element on either side of a longitudinal central axis bisecting the second sensor element.

3. The capacitive sensor array of claim 2, wherein the second sensor element intersects the first sensor element at fewer than three intersections within a first unit cell associated with the first sensor element and the second sensor element.

4. The capacitive sensor array of claim 3, wherein the second sensor element intersects the first sensor element at two intersections within the first unit cell, wherein the two intersections are on opposite sides of a central axis of the second sensor element.

5. The capacitive sensor array of claim 3, wherein the second sensor element intersects the first sensor element at a single intersection within the first unit cell, wherein the intersection is located on a central axis of the second sensor element.

6. The capacitive sensor array of claim 1, wherein each connecting trace from the plurality of connecting traces has a longitudinal axis that is substantially perpendicular to a longitudinal axis of a nearest connecting trace from the plurality of connecting traces.

7. The capacitive sensor array of claim 6, wherein each even numbered connecting trace from the plurality of connecting traces is parallel to at least one other even numbered connecting trace from the plurality of connecting traces, and wherein each odd numbered connecting trace from the plurality of connecting traces is parallel to at least one other odd numbered connecting trace from the plurality of connecting traces.

8. A capacitive sensor array, comprising:
a first sensor element of a first plurality of sensor elements;
a second sensor element comprising a plurality of subelements, wherein each of the plurality of subelements is connected to at least another of the plurality of subelements by one of a plurality of connecting traces, wherein a width of each of the plurality of subelements is greater than a width of each of the plurality of connecting traces, wherein a first subset of connecting traces of the plurality of connecting traces is positioned on a first side of a longitudinal central axis of the second sensor element, and wherein a second subset of connecting traces of the plurality of connecting traces is positioned on a second side of the longitudinal central axis opposite the first side.

9. The capacitive sensor array of claim 8, wherein each point in a unit cell associated with the first sensor element and the second sensor element is nearer to a gap between the first sensor element and the second sensor element than to a gap between any other pair of sensor elements, and wherein the unit cell contains an equal number of subelements of the second sensor element on either side of a longitudinal central axis of the second sensor element.

10. The capacitive sensor array of claim 9, wherein the second sensor element intersects the first sensor element at fewer than three intersections within a first unit cell associated with the first sensor element and the second sensor element.

11. The capacitive sensor array of claim 10, wherein the second sensor element intersects the first sensor element at two intersections per unit cell, wherein the two intersections are on opposite sides of a central axis of the second sensor element.

12. The capacitive sensor array of claim 10, wherein the second sensor element intersects the first sensor element at a single intersection within the first unit cell, wherein the intersection is located on a central axis of the second sensor element.

13. The capacitive sensor array of claim 9, wherein each connecting trace from the plurality of connecting traces has a longitudinal axis that is substantially perpendicular to a longitudinal axis of a nearest connecting trace from the plurality of connecting traces.

14. A capacitive sensor array, comprising:
a first sensor element of a first plurality of sensor elements; and
a second sensor element comprising a plurality of subelements connected together by a plurality of connecting traces, wherein each point in a unit cell associated with the first sensor element and the second sensor element is nearer to a gap between the first sensor element and the second sensor element than to a gap between any other pair of sensor elements, wherein the unit cell contains an equal number of subelements of the second sensor element on either side of a longitudinal central axis of the second sensor element, and wherein the second sensor element intersects the first sensor element at fewer than three intersections within a first unit cell associated with the first sensor element and the second sensor element.

15. The capacitive sensor of claim 14, wherein the second sensor element intersects the first sensor element at two intersections per unit cell, wherein the two intersections are located on opposite sides of a central axis of the second sensor element.

16. The capacitive sensor of claim 14, wherein the second sensor element intersects the first sensor element at a single intersection within the first unit cell, wherein the intersection is located on a central axis of the second sensor element.

17. The capacitive sensor of claim 14, wherein connecting traces in a subset of the plurality of connecting traces are staggered about a central axis of the second sensor element.

18. The capacitive sensor of claim 14, wherein a first subset of connecting traces of the plurality of connecting traces is positioned on a first side of a longitudinal central axis of the second sensor element, and wherein a second subset of connecting traces of the plurality of connecting traces is positioned on a second side of the longitudinal central axis opposite the first side.

19. The capacitive sensor of claim 14, wherein the first sensor element comprises a second plurality of subelements connected together by a second plurality of connecting traces, and wherein the second plurality of connecting traces includes connecting traces that are staggered about a central axis of the first sensor element.

20. The capacitive sensor of claim 14, wherein each connecting trace from the plurality of connecting traces has a longitudinal axis that is substantially perpendicular to a longitudinal axis of a nearest connecting trace from the plurality of connecting traces.

* * * * *